United States Patent Office 2,779,999
Patented Feb. 5, 1957

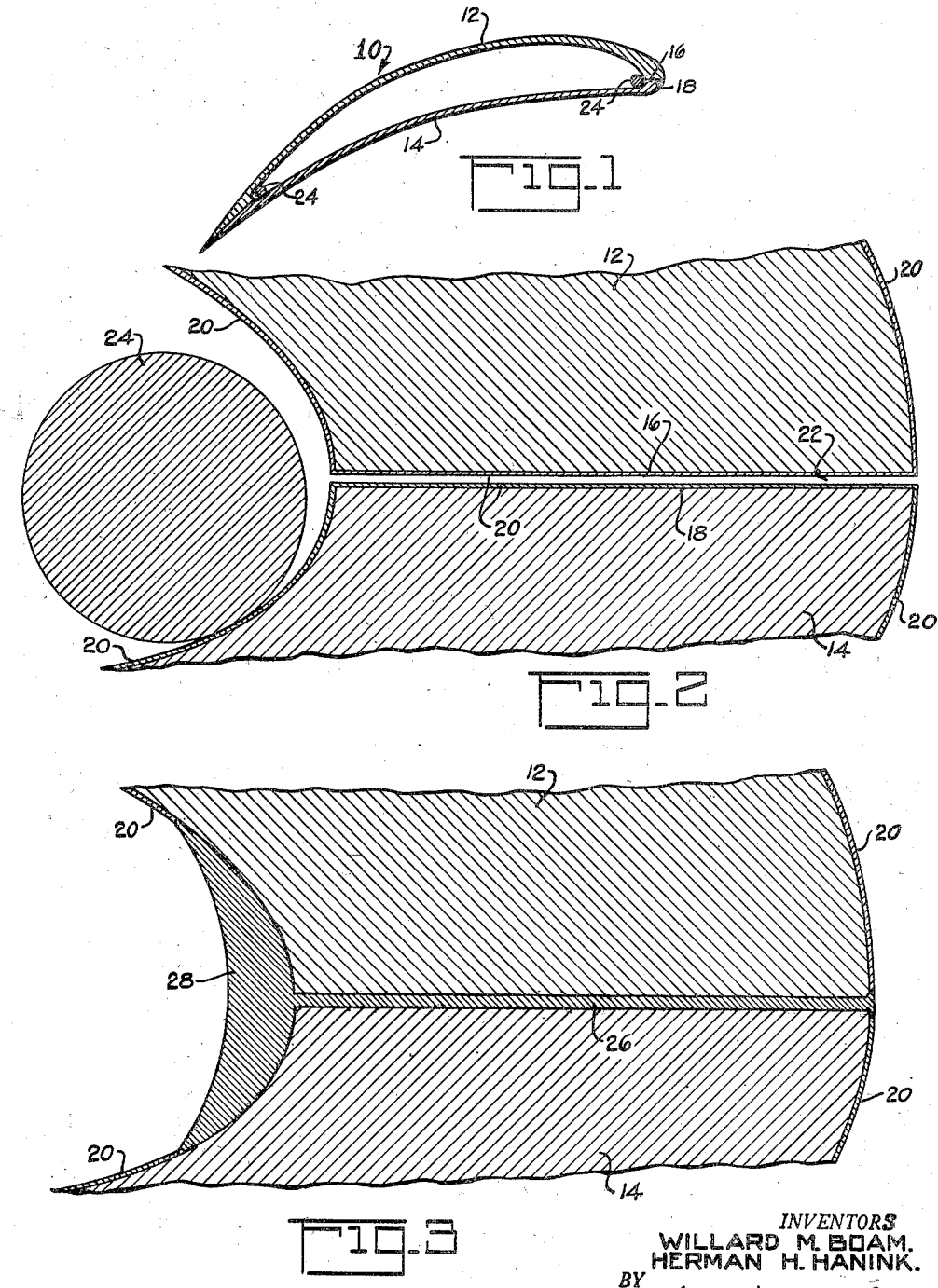

2,779,999

METHOD OF COPPER BRAZING

Willard M. Boam, Fairlawn, and Herman H. Hanink, Ridgewood, N. J., assignors to Curtiss-Wright Corporation, a corporation of Delaware Application January 4, 1952, Serial No. 264,862

3 Claims. (Cl. 29—498)

The invention relates to brazing and is particularly directed to a method of brazing with copper and to a brazed joint produced thereby.

A conventional copper brazed joint does not have good oxidation resistance at temperatures over 1000° F. An object of the present invention comprises the provision of a novel method of brazing with copper so as to improve the corrosion and oxidation resistance of the resulting brazed joint. It has been found that the addition of nickel to a copper brazed joint greatly improves its oxidation resistance. Therefore, a further object of the present invention comprises the provision of a novel method of brazing with copper so as to incorporate nickel in the brazed joint.

The invention is particularly applicable to steel alloys having a small percentage of chromium. Steel alloys having more than about 0.5% chromium normally must be brazed in an atmosphere of very dry hydrogen in a batch-type furnace because of the difficulty of reducing oxides from their surfaces. If, however, parts made of such alloys are first plated with nickel, then said brazing process can be simplified in that said parts can be brazed in a continuous-type brazing furnace with a commercial atmosphere, such as commercial hydrogen or dissociated ammonia. At the same time nickel plating improves the high temperature corrosion and oxidation resistance of said parts. In addition when such nickel plated parts are copper brazed together, the portion of the nickel coating over the surfaces to be joined by brazing alloys with the copper to provide a copper-nickel alloy brazed joint having the aforementioned improved oxidation resistant properties. Accordingly a further object of the present invention comprises the provision of a copper brazing process in which the parts to be brazed together are first plated with nickel.

Other objects of the invention will become apparent upon reading the annexed detailed description in connection with the drawing in which:

Fig. 1 is a sectional view of a hollow axial flow compressor blade to be brazed by the method of the present invention;

Fig. 2 is an enlarged sectional view of one of the joints of Fig. 1 just prior to brazing; and Fig. 3 is an enlarged sectional view of a completed brazed joint embodying the invention.

The brazing method and joint of the invention is disclosed in connection with a hollow axial flow compressor blade in which the blade is fabricated, as is conventional, from two sheet metal plates by brazing the edges of said plates together. As will appear however, the invention obviously is not limited to this use.

Referring to Figs. 1–3 of the drawing, a hollow axial flow compressor blade is designated generally by reference numeral 10. As illustrated, said compressor blade is fabricated from a pair of metal plates 12 and 14 which are to be brazed together along their edges to form a complete blade 10. In preparation for the brazing operation, the leading and trailing edges of each plate are ground to provide or are formed with surfaces adapted to abut corresponding surfaces on the other plate. For example, the leading edges of the plates 12 and 14 are formed with surfaces 16 and 18 which are to be brazed together in abutting relation. Corresponding surfaces are formed at the trailing edges of said plates.

In accordance with the invention, before the plates 12 and 14 are brazed together along their leading and trailing edges, said plates are electrolytically plated with a thin coating 20 of nickel. This thin coating 20 is illustrated in the enlarged view of Fig. 2 and as there shown said coating not only extends over the portions of the surfaces of the plates 12 and 14 to be brazed together but also over the remainder of the surface of each said plate whereby said nickel coating provides each said plate with an oxidation resistant outer surface. Before electroplating, all surface oxides must be removed from the plates 12 and 14, for example by suitable chemical treatment as is conventional in electroplating practice.

The nickel coated plates 12 and 14 are brought together with a clearance 22 of the order of 0.001 inch and are then brazed with copper in a manner similar to conventional copper brazing. Thus a strip 24 of copper brazing wire is laid along each edge of and inside the hollow blade 10 adjacent to the surfaces of the blade plates 12 and 14 to be brazed together. The blade is then passed through a continuous brazing furnace having an atmosphere of commercial hydrogen or dissociated ammonia and maintaining a brazing temperature of 2000 to 2100° F. During this brazing operation at least a portion of the nickel coating on the surfaces being brazed together alloys with the copper brazing metal to provide a nickel-copper alloy brazed joint 26 (Fig. 3) between the plates 12 and 14. At the same time, at least some of the nickel which does not alloy with the copper diffuses into the base metal to increase the strength of the bond between the plated nickel coating and the base metal. A copper-nickel alloy fillet 28 is also formed by the brazing operation.

The aforementioned small clearance 22 of 0.001 inch is such as results from bringing surfaces having an average or normal ground finish into contact. Conventional copper brazing is generally carried out at substantially zero clearance. With the present invention, however, the alloying action of the nickel and copper makes penetration of the brazing copper into the space between the surfaces being brazed somewhat sluggish. Hence a somewhat larger clearance, of 0.001 inch, is required with the present invention.

The invention is particularly applicable to steel alloys having 0.5 to 5.0 percent chromium. If the steel alloy contains more than 5 percent chromium then a nickel alloy coating 20 of more than 0.0005 inch thickness is required to protect the steel against oxidation during brazing in an atmosphere of commercial hydrogen or dissociated ammonia. However a nickel coating thickness in excess of 0.0005 inch substantially lowers the strength of the brazed joint. On the other hand if the thickness of the nickel coating 20 is less than 0.0002 inch, said coating would not provide said chromium steel alloys with adequate protection against oxidation resistance during brazing in an atmosphere of commercial hydrogen or dissociated ammonia.

If a steel part contains less than 0.5 percent chromium it can be copper brazed in a commercial atmosphere such as commercial hydrogen or dissociated ammonia. Accordingly nickel plating of steel parts containing less than 0.5 percent chromium is not necessary in order to provide said parts with oxidation protection during commercial copper brazing. Nevertheless if steel parts to be copper brazed together and containing less than 0.5 percent chromium are nickel-plated prior to copper brazing the resulting brazed joint has good corrosion and oxidation resistance at temperatures at least as high as 1000° F. thereby providing a brazed joint which is superior to that produced by conventional copper brazing.

With a nickel coating of 0.0002 to 0.0005 inch disposed over the surfaces of parts to be brazed together and with said surfaces disposed so that the clearance therebetween is of the order of 0.001 inch for the subsequent brazing operation, the brazed joint produced by copper brazing contains 8–12 percent nickel with the balance copper. This is so because nickel dissolves into molten copper and, at said brazing temperature, as soon as sufficient nickel has dissolved into the copper to form an alloy of 8–12 percent nickel said alloy freezes. With the dimensions specified for the thickness of the nickel coating 20 and for the clearance between the surfaces of the parts 12 and 14 to be brazed together there obviously is more than enough nickel to form a nickel-copper alloy between said surfaces having 8–12 percent nickel. Accordingly after the brazing operation at least a thin layer of nickel (not shown) remains over the brazed surfaces of the parts 12 and 14 and the brazed joint therebetween comprises a nickel-copper alloy having 8–12 percent nickel with the balance copper. In general, however, the fillet 28 will contain less than 8–12 percent nickel because of the large amount of copper forming said fillet. Thus the brazed joint of the present invention contains approximately 10 percent nickel and 90 percent copper. Such a copper-nickel alloy brazed joint has greatly improved high temperature oxidation resistance as compared to a conventional copper brazed joint. For example the strength of a copper-nickel alloy brazed joint made in accordance with the invention did not drop as a result of exposure for forty-eight hours to an oxidizing atmosphere (air) at 1000° F. whereas the strength of a conventional copper brazed joint decreases approximately 15% as a result of similar treatment.

From what has been said, a nickel plate of 0.0002 to 0.0005 inch over steel parts to be copper brazed together results in the brazed joint having substantially improved corrosion and oxidation resistance such that said joint has good corrosion and oxidation resistance at temperatures at least as high as 1000° F. In addition for steel parts having 0.5 to 5 percent chromium, said nickel plate has the further advantage in that it provides said chromium-steel alloy parts with a sufficient protection against oxidation to permit copper brazing in an ordinary commercial atmosphere such as commercial hydrogen or dissociated ammonia whereas in the absence of said nickel plate said chromium-steel alloy parts would have to be brazed in a batch-type furnace in a very dry hydrogen atmosphere.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. The method of fabricating a structure from a plurality of steel parts containing 0.5 to 5.0 percent chromium, said method comprising the steps of first plating the entire surface of each of said parts with nickel to a thickness of 0.0002 inch to 0.0005 inch; disposing portions of the nickel plated surfaces of said parts in substantially abutting relation with a clearance therebetween of approximately 0.001 inch; and then copper brazing said surface portions together at a temperature of at least 2000° F.

2. The method of fabricating a structure from a plurality of steel parts containing 0.5 to 5.0 percent chromium, said method comprising the steps of first plating the entire surface of each of said parts with nickel to a thickness of 0.0002 inch to 0.0005 inch; disposing portions of the nickel plated surfaces of said parts in substantially abutting relation with a clearance therebetween of approximately 0.001 inch; and then copper brazing said surface portions together at a temperature of 2000 to 2100° F.

3. The method of fabricating a structure from a pair of steel parts at least one of which has 0.5 to 5.0 percent chromium, said method comprising the steps of plating the entire surface of said chromium containing part with nickel to a thickness of 0.0002 to 0.0005 inch and plating with nickel to said thickness at least the portion of the surface of the other part to be joined to said chromium containing part; disposing portions of the nickel plated surfaces of said parts in substantially abutting relation with a clearance therebetween of at least 0.001 inch; and then copper brazing said portions together at a temperature of at least 2000° F.

References Cited in the file of this patent

UNITED STATES PATENTS

| | | |
|---|---|---|
| 1,829,179 | Back | Oct. 27, 1931 |
| 1,898,487 | Hurley | Feb. 21, 1933 |
| 2,174,733 | Chace | Oct. 3, 1939 |
| 2,214,002 | Trainer | Sept. 10, 1940 |
| 2,225,868 | Huston | Dec. 24, 1940 |
| 2,231,888 | Couch | Feb. 18, 1941 |
| 2,269,523 | Deutsch | Jan. 13, 1942 |
| 2,280,337 | McKee | Apr. 21, 1942 |
| 2,428,033 | Nachtman | Sept. 30, 1947 |
| 2,471,663 | Tietz | May 31, 1949 |
| 2,473,712 | Kinney | June 21, 1949 |
| 2,606,362 | Martin | Aug. 12, 1952 |
| 2,609,598 | Mason | Sept. 9, 1952 |
| 2,633,633 | Bogart | Apr. 7, 1953 |

FOREIGN PATENTS

| | | |
|---|---|---|
| 309,032 | Great Britain | Oct. 24, 1949 |